United States Patent
Chen et al.

(10) Patent No.: US 7,073,010 B2
(45) Date of Patent: Jul. 4, 2006

(54) USB SMART SWITCH WITH PACKET RE-ORDERING FOR INTERLEAVING AMONG MULTIPLE FLASH-MEMORY ENDPOINTS AGGREGATED AS A SINGLE VIRTUAL USB ENDPOINT

(75) Inventors: Ben Wei Chen, Fremont, CA (US); Horng-Yee Chou, Palo Alto, CA (US); Sun-Teck See, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 280 days.

(21) Appl. No.: 10/707,276

(22) Filed: Dec. 2, 2003

(65) Prior Publication Data

US 2005/0120157 A1 Jun. 2, 2005

(51) Int. Cl.
*G06F 13/20* (2006.01)
(52) U.S. Cl. ..................................... 710/313
(58) Field of Classification Search ............... 710/313
See application file for complete search history.

(56) References Cited

U.S. PATENT DOCUMENTS

| | | | | |
|---|---|---|---|---|
| 5,835,791 | A * | 11/1998 | Goff et al. ..................... 710/62 |
| 6,044,428 | A | 3/2000 | Rayabhari .................... 710/305 |
| 6,230,226 | B1 * | 5/2001 | Hu et al. ..................... 710/305 |
| 6,282,670 | B1 | 8/2001 | Rezaul Islam et al. ........ 714/6 |
| 6,282,671 | B1 | 8/2001 | Islam et al. ..................... 714/6 |
| 6,389,029 | B1 * | 5/2002 | McAlear ..................... 370/402 |
| 6,445,704 | B1 | 9/2002 | Howes et al. ............... 370/392 |
| 6,457,068 | B1 * | 9/2002 | Nayyar et al. ................. 710/3 |
| 6,519,678 | B1 | 2/2003 | Basham et al. ............. 711/112 |
| 6,553,408 | B1 | 4/2003 | Merrell et al. .............. 709/213 |
| 6,553,446 | B1 * | 4/2003 | Miller ........................ 710/307 |
| 6,574,709 | B1 | 6/2003 | Skazinski et al. ........... 711/119 |
| 6,587,898 | B1 | 7/2003 | Larson et al. ............... 709/200 |
| 6,633,998 | B1 | 10/2003 | Lau ............................. 714/14 |
| 6,862,643 | B1 * | 3/2005 | Wu et al. .................... 710/302 |
| 2002/0152348 | A1 * | 10/2002 | Scales et al. ............... 710/313 |
| 2004/0008705 | A1 * | 1/2004 | Lindsay ...................... 370/401 |
| 2004/0015596 | A1 * | 1/2004 | Sapuram et al. ........... 709/230 |

OTHER PUBLICATIONS

W722 USB Hub/Compound Device Controller 0.5 um Technology Megamacro Function, Aug. 1997.*

* cited by examiner

*Primary Examiner*—Paul R. Myers
(74) *Attorney, Agent, or Firm*—Stuart T. Auvinen

(57) ABSTRACT

A dual-mode Universal-Serial-Bus (USB) switch can operate in a normal hub mode to buffer transactions from a host to multiple USB flash storage blocks that are USB endpoints. When operating in a single-endpoint mode, the dual-mode USB switch intercepts packets from the host and responds to the host as a single USB endpoint. The USB switch aggregates all downstream USB flash storage blocks and reports a single pool of memory to the host as a single virtual USB memory. Adjacent transactions can be overlapped by packet re-ordering. A token packet that starts a following transaction is re-ordered to be sent to the USB flash storage blocks before the data and handshake packets that end a first transaction, allowing the second transaction to begin accessing the flash memory earlier. Data can be mirrored or striped across several USB flash storage blocks and parity can be added for error recovery.

19 Claims, 15 Drawing Sheets

| 1ST TRANS. \ NEXT TRANS. | | RD SEG A M | RD SEG A N | RD SEG B M | RD SEG B N | WR SEG A M | WR SEG A N | WR SEG B M | WR SEG B N |
|---|---|---|---|---|---|---|---|---|---|
| RD SEG A | ADR: M | X | R | R | R | X | R | R | R |
| RD SEG A | ADR: N | R | X | R | R | R | X | R | R |
| RD SEG B | ADR: M | R | R | X | R | R | R | X | R |
| RD SEG B | ADR: N | R | R | R | X | R | R | R | X |
| WR SEG A | ADR: M | X | R | R | R | X | R | R | R |
| WR SEG A | ADR: N | R | X | R | R | R | X | R | R |
| WR SEG B | ADR: M | R | R | X | R | R | R | X | R |
| WR SEG B | ADR: N | R | R | R | X | R | R | R | X |

R = RE-ORDER TOKEN PACKETS
X = DON'T RE-ORDER TOKEN PACKETS

USB SMART SWITCH WITH PACKET RE-ORDERING FOR INTERLEAVING AMONG MULTIPLE FLASH-MEMORY ENDPOINTS AGGREGATED AS A SINGLE VIRTUAL USB ENDPOINT

BACKGROUND OF INVENTION

This invention relates to Universal-Serial-Bus (USB) hubs, and more particularly to a USB switch that aggregates endpoints into a single virtual endpoint.

Universal-Serial-Bus (USB) has become a popular standard interface for connecting peripherals to a host such as a personal computer (PC). USB flash-memory drives and devices have been developed to transport data from one host to another, replacing floppy disks. While large external flash drives may be used, smaller USB flash drives known as key-chain or key drives have been a rapidly growing market.

USB hubs allow one USB port on a host to fan out to multiple end USB devices or endpoints. A basic USB hub has a repeater that repeats data from the host to all downstream devices, while more intelligent hubs based on the USB 2.0 standard can buffer data to different downstream ports. This is especially useful when both faster and slower endpoint USB devices are connected to the same hub, since the slower hub's transaction can be buffered by the hub to allow a simultaneous transaction to the higher speed device. Software on the host can schedule transactions to different speed devices using split transaction commands to high-speed hubs. However, split transactions are not useful when all devices are already operating at the highest speed allowed by USB 2.0.

Whether transactions are buffered or not, all endpoint USB devices are visible to the host. The host can query each endpoint USB device for its status and can transfer data to or from each endpoint device. This is necessary when different kinds of endpoint devices are attached to a hub, such as a printer and a disk drive.

FIG. 1 shows a prior-art USB hub that connects to multiple flash-memory USB endpoint devices. Host 10 includes USB host controller 12 that generates transactions to USB devices over USB bus 18 using the USB protocol. USB hub 20 is connected to a cable containing USB bus 18. USB hub 20 fans out USB bus 18 to several downstream USB devices that connect over additional USB bus segments.

Three USB flash-memory systems 14, 15, 16 are connected to USB hub 20 by USB bus segments. USB flash-memory system 14 can be accessed by USB host controller 12 through USB hub 20 and appears to the user as drive E:, when host 10 is a PC that has a hard drive C: and an optical drive D: already installed. Since USB hub 20 passes all host transfers through to downstream devices, USB flash-memory system 15 is visible to host 10 as a second flash drive and is designated as drive F:, while USB flash-memory system 16 is visible to the host as a third flash drive designated as G: to the user.

As additional devices are added to host 10, either through USB hub 20 or through another interface, drives letters in ascending order are assigned to each new memory device. When many USB flash-memory systems such as flash cards are attached, the drive letters can reach the end of the alphabet, and even before then the user is presented with many drives to keep track of and to choose from when storing or transferring data. This can be confusing and annoying to the user in much the same way that partitioned disk drives having multiple drive letters were.

What is desired is to aggregate multiple USB flash-memory systems together. It is desired to have all USB flash-memory systems appear as a single virtual USB endpoint so that the PC user sees the aggregated flash drives as a single drive letter. An intelligent USB hub that can act as a USB switch and aggregate multiple endpoints as a single USB for the host is desirable.

BRIEF DESCRIPTION OF DRAWINGS

FIG. 7 is a table showing possible re-ordering packet sequences.

DETAILED DESCRIPTION

The present invention relates to an improvement in USB hubs. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
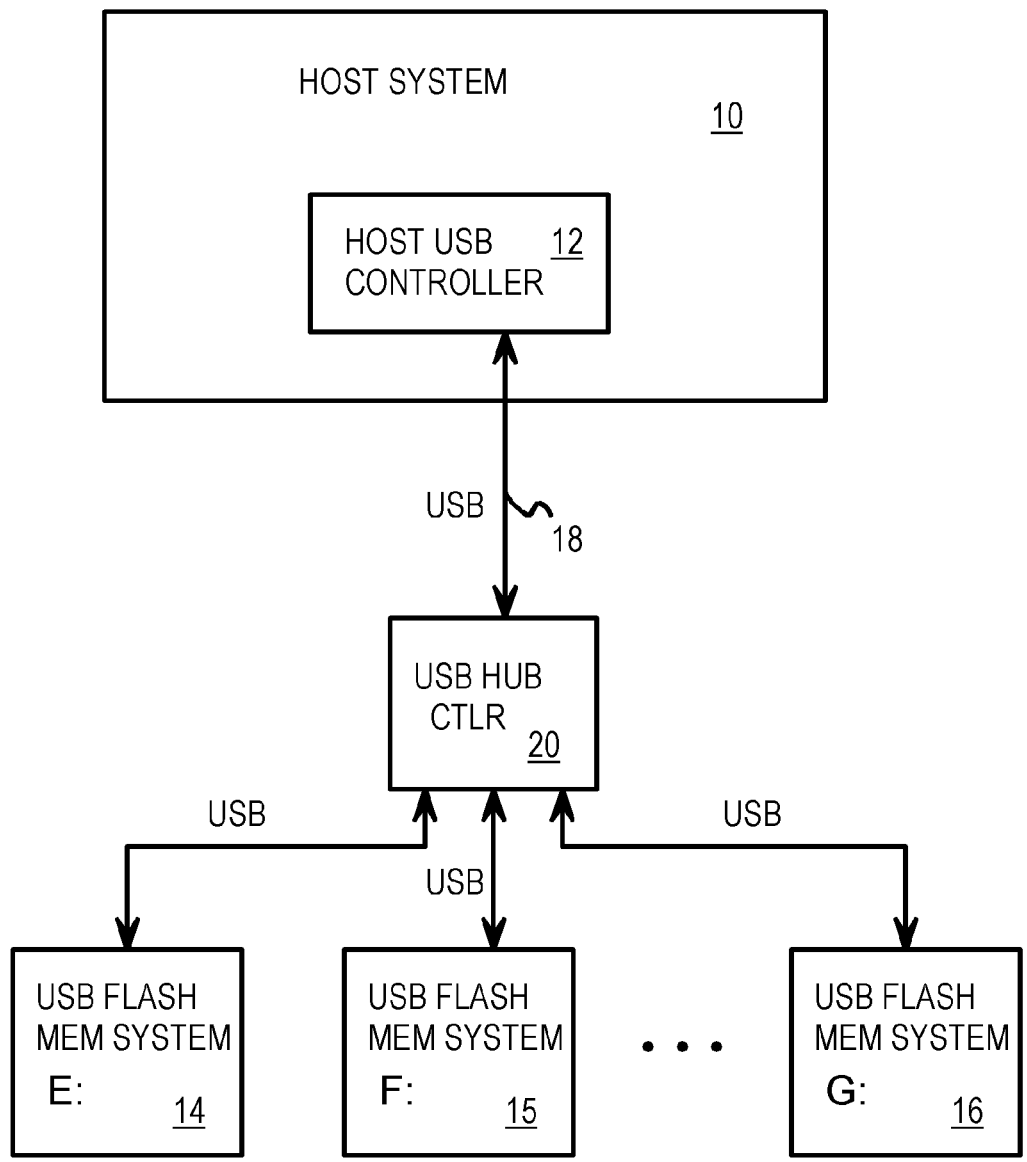
FIG. 1 shows a prior-art USB hub that connects to multiple flash-memory USB endpoint devices.
Figure 2:
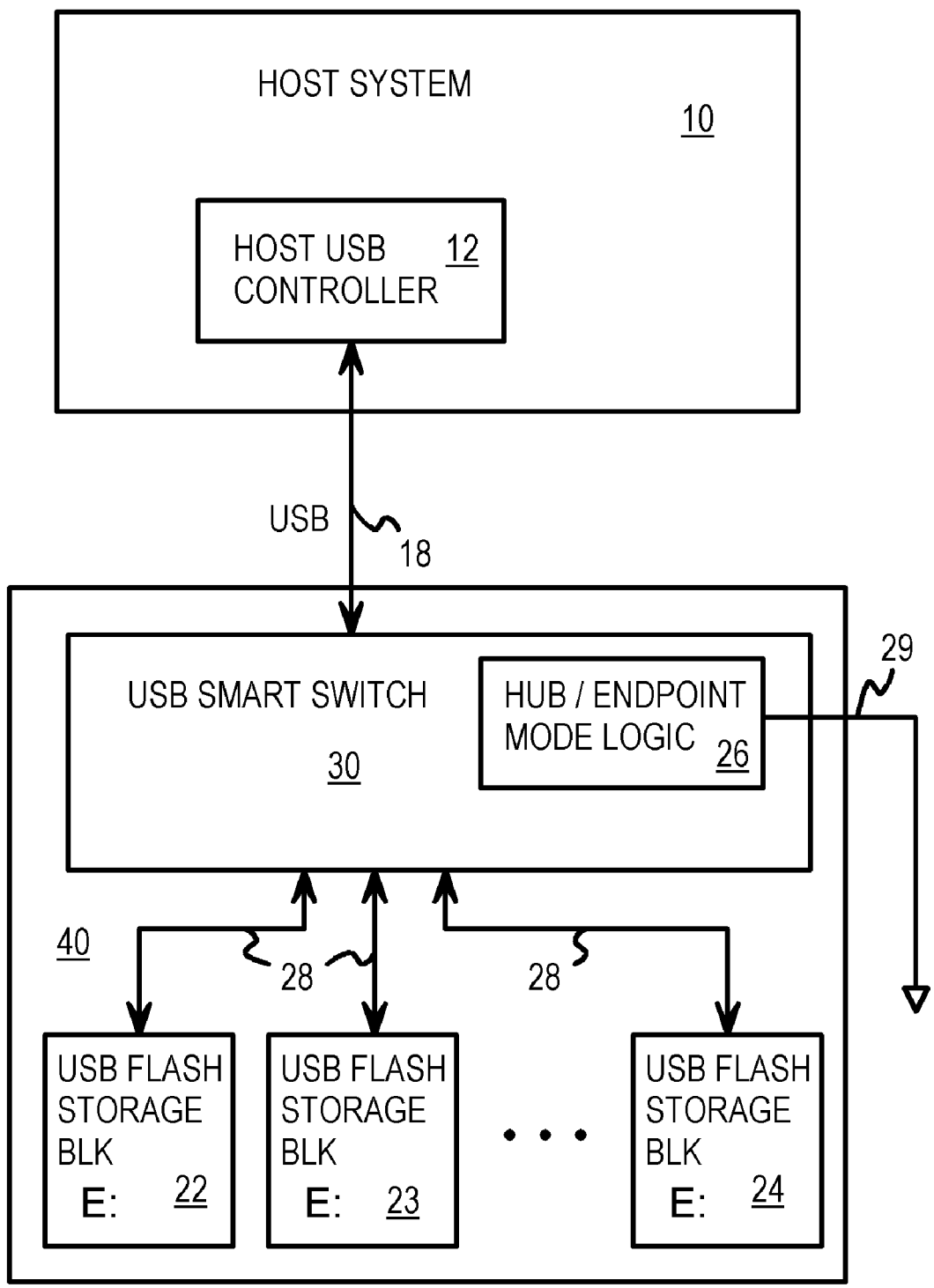
FIG. 2 is a block diagram of a USB switch that aggregates and virtualizes multiple flash-memory endpoints.

FIG. 2 is a block diagram of a USB switch that aggregates and virtualizes multiple flash-memory endpoints. USB host controller 12 for host 10 sends transactions over USB bus 18 to USB multi-flash device 40. USB switch 30 on USB multi-flash device 40 receives and responds to transaction from host 10 over USB bus 18.

Mode logic 26 causes USB switch 30 to operate in one of two modes. When mode pin 29 is grounded, mode logic 26 causes USB switch 30 to operate in a single-endpoint mode, where USB switch 30 aggregates all downstream USB flash-memory systems into a single USB endpoint that is visible host 10. The details about the number, size, speed, and arrangement of the physical USB flash-memory devices is hidden from USB host controller 12 by USB switch 30 when operating in single-endpoint mode. Host 10 sees a single pool of memory having one set of attributes. Attributes reported to host 10 can be chosen by transaction manager 36, such as the slowest access time, or the sum of all the good blocks of memory.

When operating in single-endpoint mode, USB switch 30 acts as the final USB endpoint for transactions on USB bus 18 to host 10. USB switch 30 generates USB transactions on hidden USB buses 28 to USB flash storage blocks 22, 23, 24. USB flash storage blocks 22, 23, 24 respond to USB switch 30 over hidden USB buses 28 with USB switch 30 acting as the USB host on hidden USB buses 28. USB switch 30 then forwards data to host 10 by acting as the endpoint. Thus USB flash storage blocks 22, 23, 24 are hidden from host 10 when mode logic 26 activates the single-endpoint mode.

USB flash storage blocks 22, 23, 24 are aggregates together by USB switch 30, which maps and directs data transactions to selected USB flash storage blocks 22, 23, 24. Since USB switch 30 performs memory management, USB flash storage blocks 22, 23, 24 appear as a single, contiguous memory to host 10. Since host 10 sees USB switch 30 as the only endpoint of USB bus 18, data read or written to USB flash storage blocks 22, 23, 24 are all on a single virtual drive, such as drive letter E: on a PC. The details and complexities of USB flash storage blocks 22, 23, 24 are hidden from the end user.

When mode pin 29 is not grounded, mode logic 26 causes USB switch 30 to operate in multi-endpoint or hub mode. In hub mode, USB switch 30 acts as a normal USB hub, passing transactions from USB host controller 12 on USB bus 18 over hidden USB buses 28 to USB flash storage blocks 22, 23, 24. Host 10 then sees USB flash storage blocks 22, 23, 24 as the final USB endpoints. Each of the multiple flash endpoints appears as a different drive letter, E:, F:, G:, etc.

Figure 3:
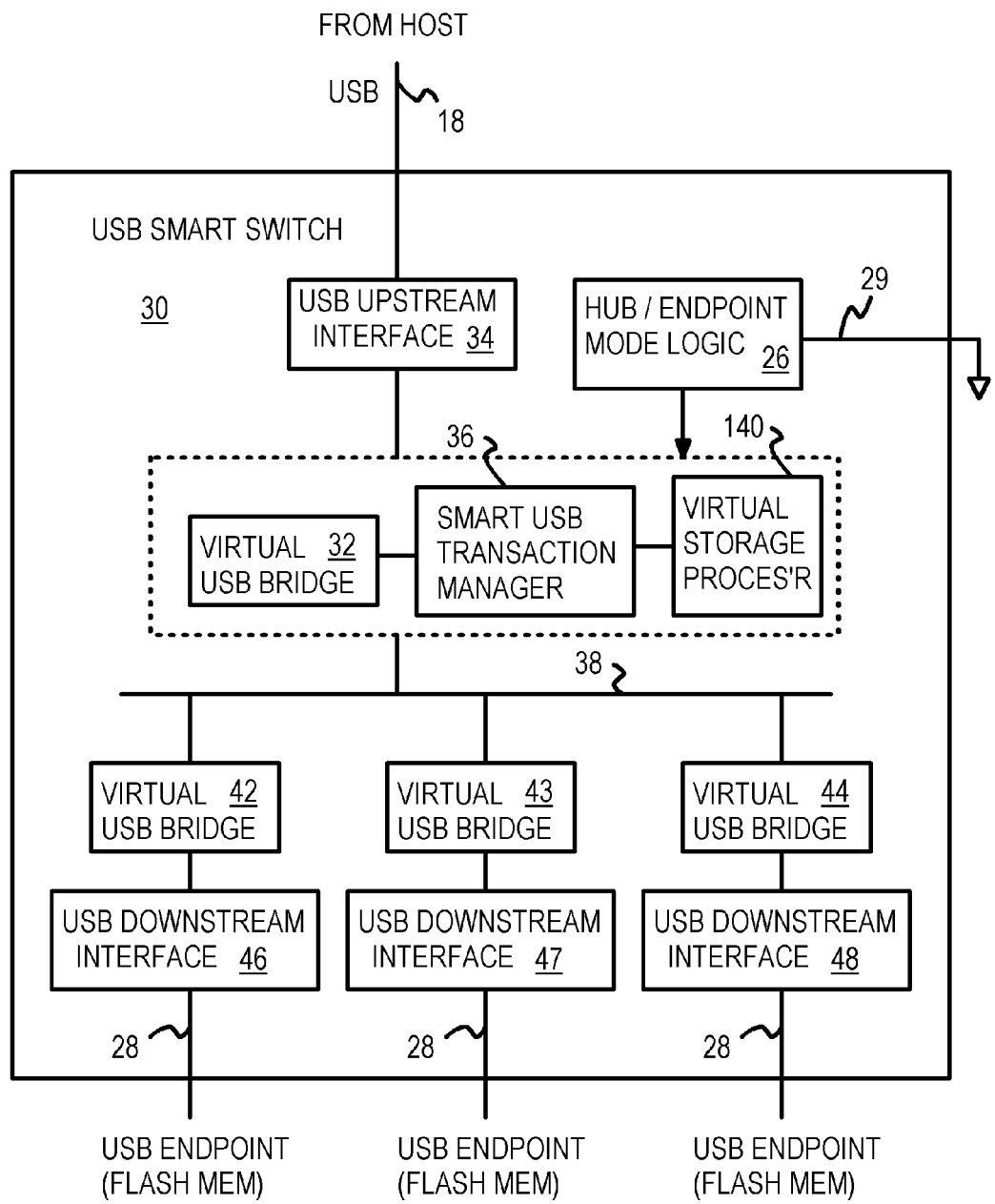
FIG. 3 shows the dual-mode USB switch in more detail.

FIG. 3 shows the dual-mode USB switch in more detail. USB switch 30 connects to host USB bus 18 through USB upstream interface 34. USB switch 30 connects to downstream USB flash storage blocks over hidden USB buses 28 through USB downstream interfaces 46, 47, 48. USB interfaces provide physical signaling, such as driving and receiving differential signals on differential data lines of USB buses, detecting or generating packet start or stop patterns, checking or generating checksums, and higher-level functions such as inserting or extracting USB device addresses and packet types and commands.

Mode logic 26 senses the voltage on mode pin 29, which can be pulled down to ground externally for single-endpoint mode, or pulled high with a pull-up resistor for hub mode. Mode logic 26 activates USB switch 30 to operate as a hub or as an aggregating and virtualizing switch. For hub mode, data is buffered across virtual USB bridge 32 from the host to one of virtual USB bridges 42, 43, 44 to flash memory. Internal bus 38 allows data to flow among virtual USB bridge 32 and USB bridges 42, 43, 44. The host and the endpoint may operate at the same speed (USB low speed (LS), full speed (FS), or high-speed (HS)), or at different speeds. Buffers in virtual USB bridge 32 can store the data.

Virtual storage processor 140 provides re-mapping and translation services to transaction manager 36. For example, logical addresses from the host can be looked up and translated to physical device addresses in USB flash storage blocks 22, 23, 24.

When operating in single-endpoint mode, transaction manager 36 not only buffers data using virtual USB bridge 32, but can also re-order packets for transactions from the host. A transaction may have several packets, such as an initial token packet to start a memory read, a data packet from the memory device back to the host, and a handshake packet to end the transaction. Rather than have all packets for a first transaction complete before the next transaction begins, packets for the next transaction can be re-ordered by USB switch 30 and sent to the memory devices before completion of the first transaction. This allows more time for memory access to occur for the next transaction. Transactions are thus overlapped by re-ordering packets.

Packets sent over hidden USB buses 28 are re-ordered relative to the packet order on host USB bus 18. Transaction manager 36 may overlap and interleave transactions to different USB flash storage blocks, allowing for improved data throughput. For example, packets for several incoming USB transactions from the host are stored in virtual USB bridge 32 or an associated buffer (not shown). Transaction manager 36 examines these buffered transactions and packets and re-orders the packets before sending them over internal bus 38 to a downstream USB flash storage block.

A packet to begin a memory read of a flash block through USB bridge 43 may be re-ordered ahead of a packet ending a read of another flash block through USB bridge 42 to allow access to begin earlier for the second flash block.

Figure 4:
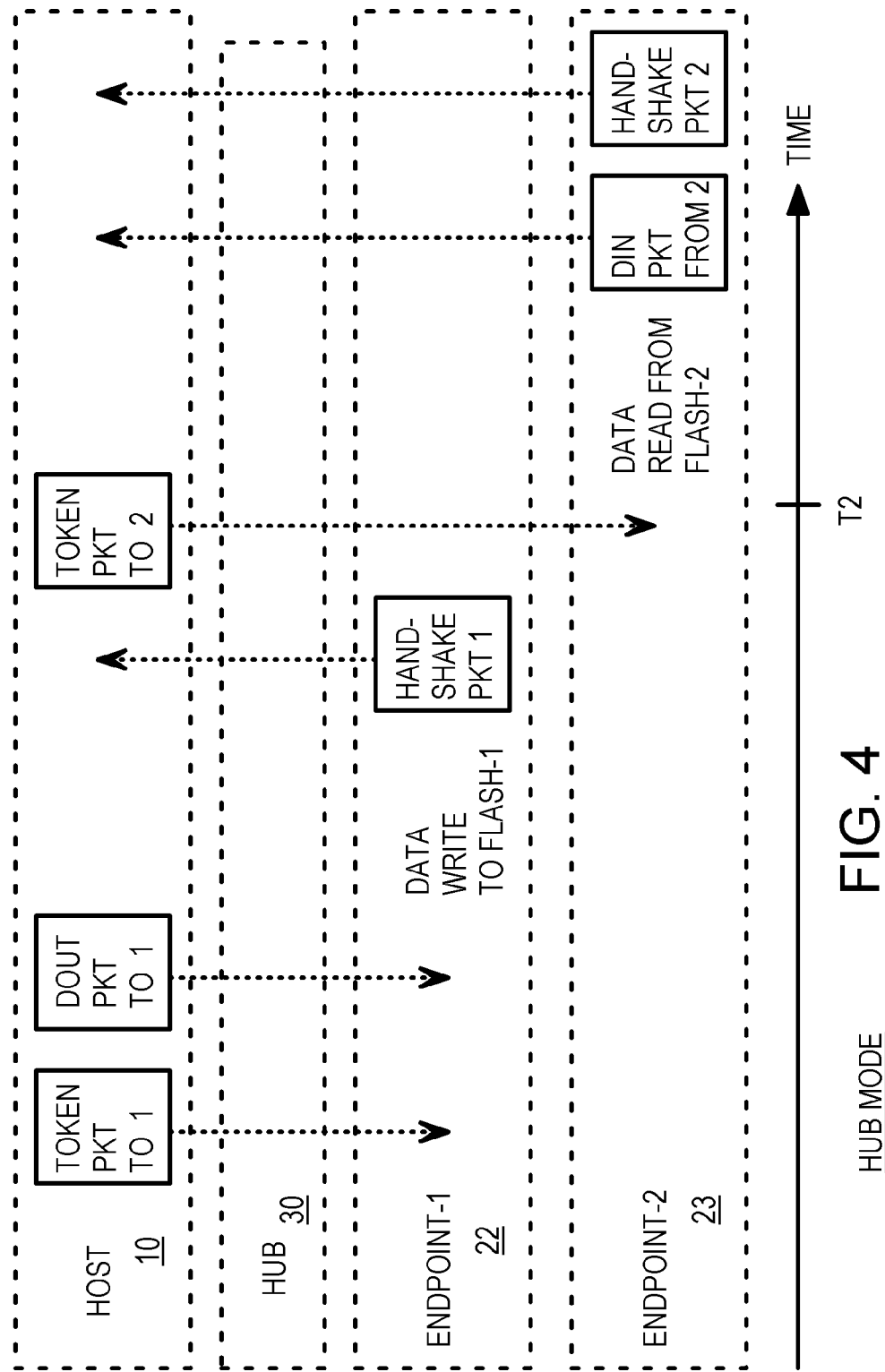
FIG. 4 is a packet-timing diagram of the USB switch operating in hub mode.

FIG. 4 is a packet-timing diagram of the USB switch operating in hub mode. USB software on host 10 schedules transactions to various USB devices for each time frame. Host 10 sends a token (non-data) packet to the flash memory device at endpoint 1. USB switch 30 passes this packet through from host 10 to endpoint-1, which is USB flash storage block 22. This token packet contains a write command to the flash block.

Next host 10 sends a data-out packet to endpoint-1, with the data to write into USB flash storage block 22. USB switch 30 acts as a hub and passes this data packet through. USB flash storage blocks 22 then writes this data into its flash memory and responds with a handshake packet back to host 10. USB switch 30 passes this handshake packet back to host 10.

Upon receiving the handshake packet from endpoint-1, host 10 then generates a second token packet that is sent to endpoint-2. USB switch 30 passes this second token packet through to USB flash storage block 23, the second USB endpoint that is addressed by the token packet. This token packet contains a flash-read command and an address to begin reading from and a length to read, so USB flash storage block 23 begins to read the requested data.

After a read access time, the data is ready to be sent back to host 10. USB flash storage block 23 packs the data into a data-in packet. The data-in packet is sent to host 10 and passes through USB switch 30. A final handshake packet is also generated by USB flash storage block 23 to signal completion of the read command. The handshake packet is passed on to host 10 by USB switch 30.

Reading of flash data in USB flash storage block 23 cannot begin until time T2, since the second token packet is not sent by host 10 until after the first acknowledgement packet is received by the host. Thus initiation of data read is delayed until the prior transaction completes. The host could use a split transaction for the write, but since the host software lacks detailed knowledge of the endpoints, any packet re-ordering would be inefficient.

Figure 5:
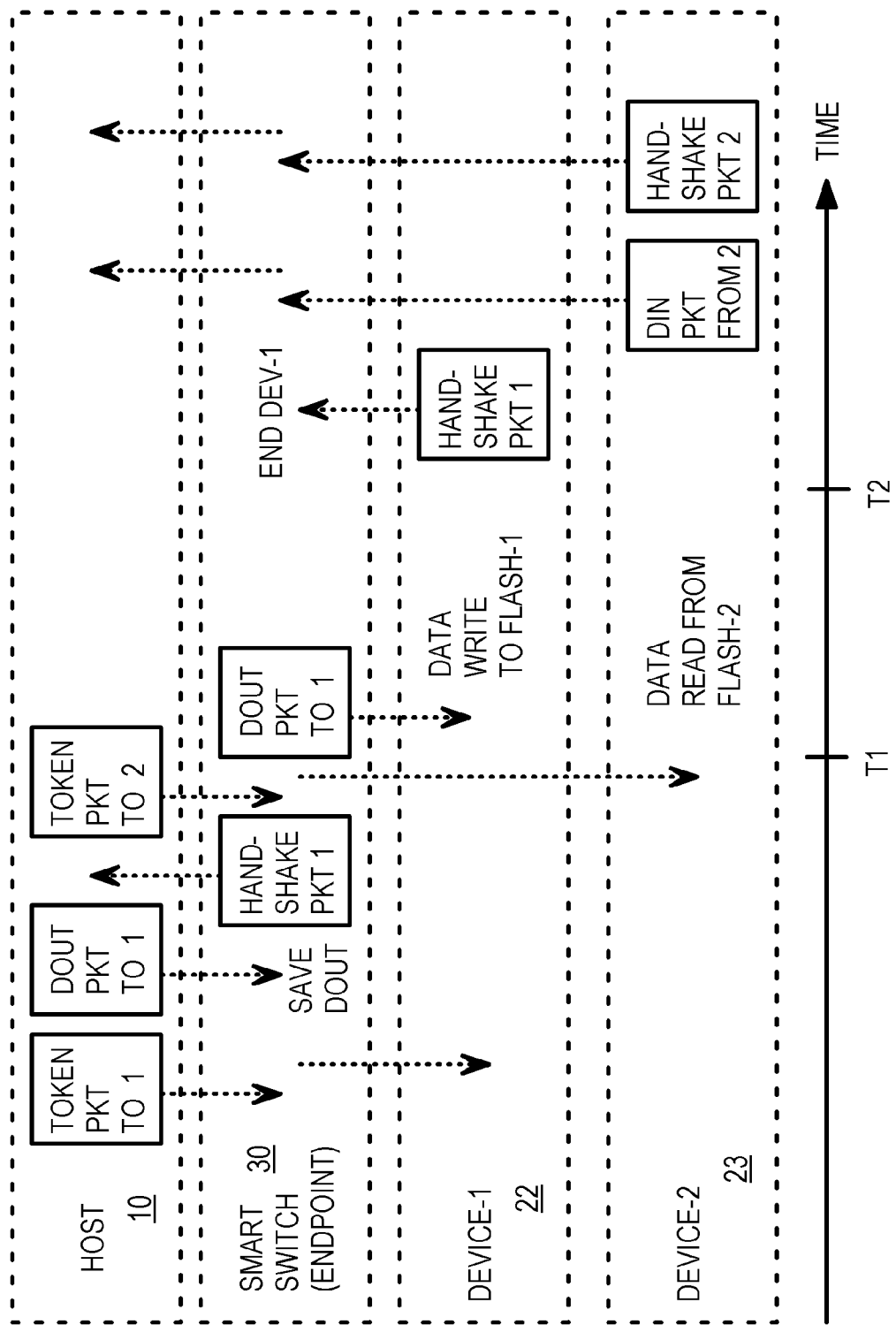
FIG. 5 is a timing diagram of packet re-ordering by the USB switch in single-endpoint mode.

FIG. 5 is a timing diagram of packet re-ordering by the USB switch in single-endpoint mode. USB switch 30 acts as the single endpoint seen by host 10. The first token packet with the command to write to USB flash storage is sent by host 10 and passed on to USB flash storage block 22. USB switch 30 determines which of USB flash storage blocks 22, 23, 24 to write, using a memory-mapping table of other memory-management techniques.

The data-out packet with the data to write from host 10 is intercepted by USB switch 30 and the data is stored in a buffer. Instead of immediately sending the data to USB flash storage block 22, USB switch 30 generates a handshake packet back to host 10. Host 10 sees completion of the first transaction even though the data has not yet been sent to the physical flash device for storage.

Host 10 can then being the second transaction, sending the second token packet with a read command. USB switch 30 receives this packet, looks up the data's address, and determines that the data is stored in USB flash storage block 23. The second token packet is sent from USB switch 30 to USB flash storage block 23. This causes USB flash storage block 23 to begin reading the data at time T1.

USB switch 30 then generates a data-out packet to USB flash storage block 22, using the data stored earlier from the data-out packet from host 10. USB flash storage block 22 can then write this data to its flash memory upon receipt of the data-out packet. USB flash storage block 22 generates an acknowledgement or handshake packet to indicate completion of the write. This handshake packet is sent to USB switch 30, which closes the hidden transaction between USB switch 30 and USB flash storage block 22. Host 10 already ended the transaction when USB switch 30 sent the initial handshake packet.

After a read-access time has elapsed, USB flash storage block 23 is ready to send the read data back to host 10. This data is packed in one or more data-in packets and sent to USB switch 30. USB switch 30 then forwards the data to host 10 in modified data-out packets that show USB switch 30 as the endpoint device. USB switch 30 can over-write the USB device address of USB flash storage block 23 with its own USB device address in the packet to make the USB data-in packet appear to host 10 as being from USB switch 30 rather than from hidden USB flash storage block 23.

A final handshake packet is generated by USB flash storage block 23 and sent to USB switch 30 to indicate completion of the read operation. USB switch 30 over-writes the USB device address of USB flash storage block 23 with the USB device address of USB switch 30 and sends the modified handshake packet to host 10, which ends the transaction.

By re-ordering the second token packet ahead of the first data-out packet, reading of USB flash storage block 23 can begin earlier, at time T1 rather than at time T2. This allows the read data to be ready earlier, so that the second transaction can end sooner. Data throughput can be improved using such packet re-ordering. In an actual system, the read access time can be longer than shown in this simplified diagram, causing a more significant delay that is reduced by re-ordering.

Due to buffering, packet transmissions from USB switch 30 may be delayed relative to packet reception more than what is shown in FIGS. 4, 5. A shift or delay at USB switch 30 may occur but is not shown in the diagrams to improve clarity of understanding basic concepts.

Figure 6:
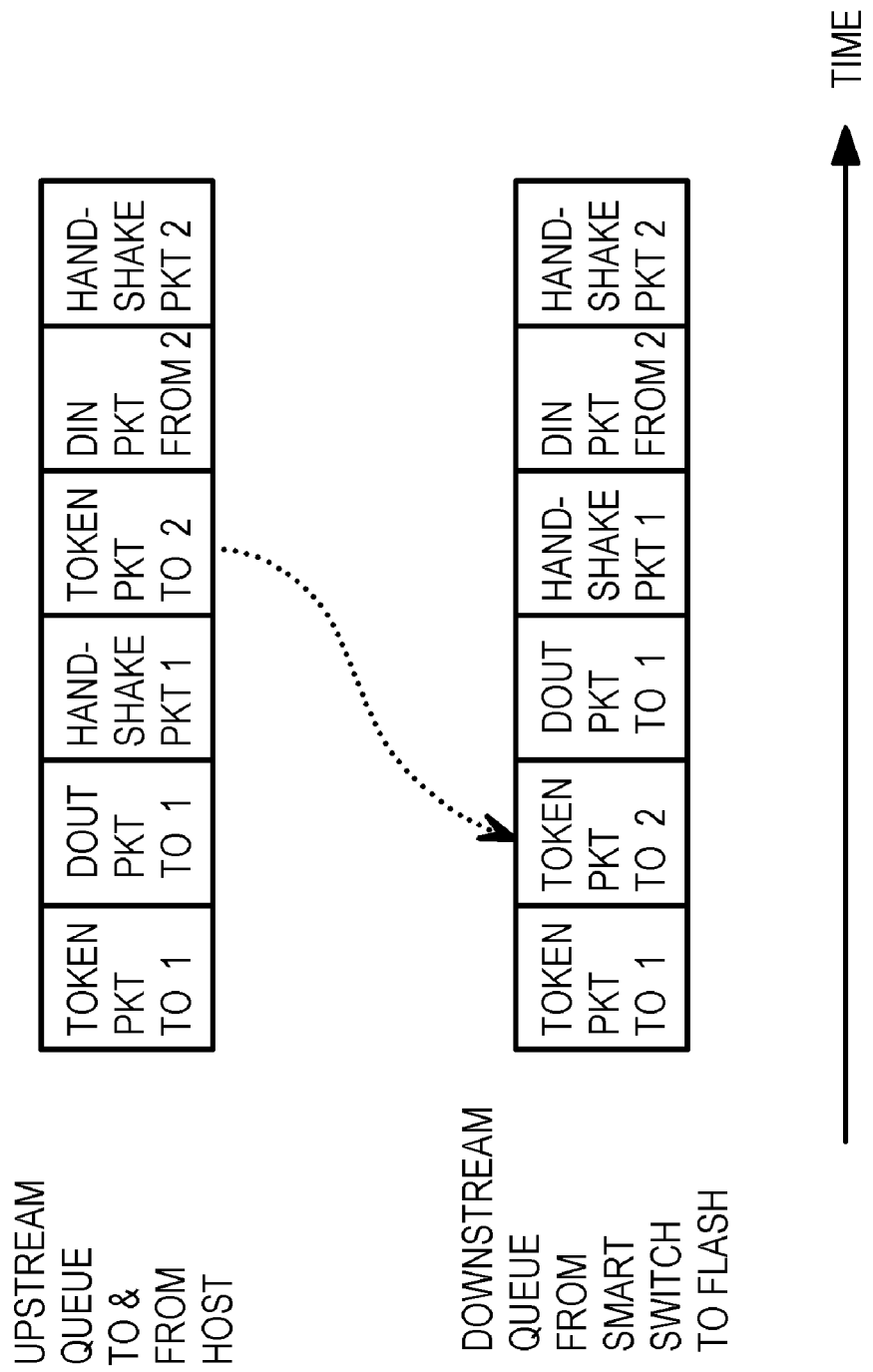
FIG. 6 shows a packet being re-ordered between upstream and downstream queues.

FIG. 6 shows a packet being re-ordered between upstream and downstream queues. The order of packets sent and received from host 10 in FIGS. 4, 5 is shown in the upstream queue to the host. Bi-directional queues are shown that have packets in both directions, although an actual implementation may have separate queues for each direction of packet flow. Separate downstream queues for each device may also be used.

The host first sends the first token packet with the read command to device 1, followed by the data-out packet with the write data. The first handshake packet is then sent to the host.

Upon receipt of the first handshake packet, the host begins the second transaction with the second token packet with the read command to device 2. The second flash device eventually reads the requested data and sends it back to the host in the data-in packet, which is followed by the second handshake packet that ends the second transaction.

In hub mode, USB switch 30 simply copies packets from the upstream queue to the downstream queue (or vice-versa) in the same order. However, in single-endpoint mode, packet can be re-ordered to improve performance. In this example, the second token packet is re-ordered in the downstream queue to USB flash storage blocks 22, 23, 24.

The second token packet that begins access of the second USB flash storage block is placed before the first data-out packet and the first handshake packet. This allows the read of the second USB flash storage block to begin earlier. Physical completion of the data write to the first USB flash storage block is delayed somewhat, but this is usually not a serious performance issue. The downstream queue reflects the packet re-ordering of FIG. 5 to the USB flash storage blocks.

FIG. 7 is a table showing possible re-ordering packet sequences. The second token packet can be reordered to just after the first token packet in sequences of first and second packets where access is not to the same physical memory location. For example, packets are not re-ordered when the first transaction is a read of address M in segment A, and the second transaction is a read or a write to the same address M in segment A. For reads and writes blocks of memory addresses, when any of the address locations overlap, re-ordering is not allowed.

When the two adjacent transactions are to a different memory segment, or to different, non-overlapping memory address locations in the same segment, then re-ordering is allowed. The vast majority of cases allows packet re-ordering.

The addresses from the host can be logical block address (LBA). The LBA is translated internally by transaction manager 36 to generate physical addresses that can be on a single chip or across different chips. Two segments could be on the same chip, but the two segments have addresses for two different locations within the chip. The address translation mechanism is governed by consideration of wear-leveling, bad-block management and memory management.

Figure 8:
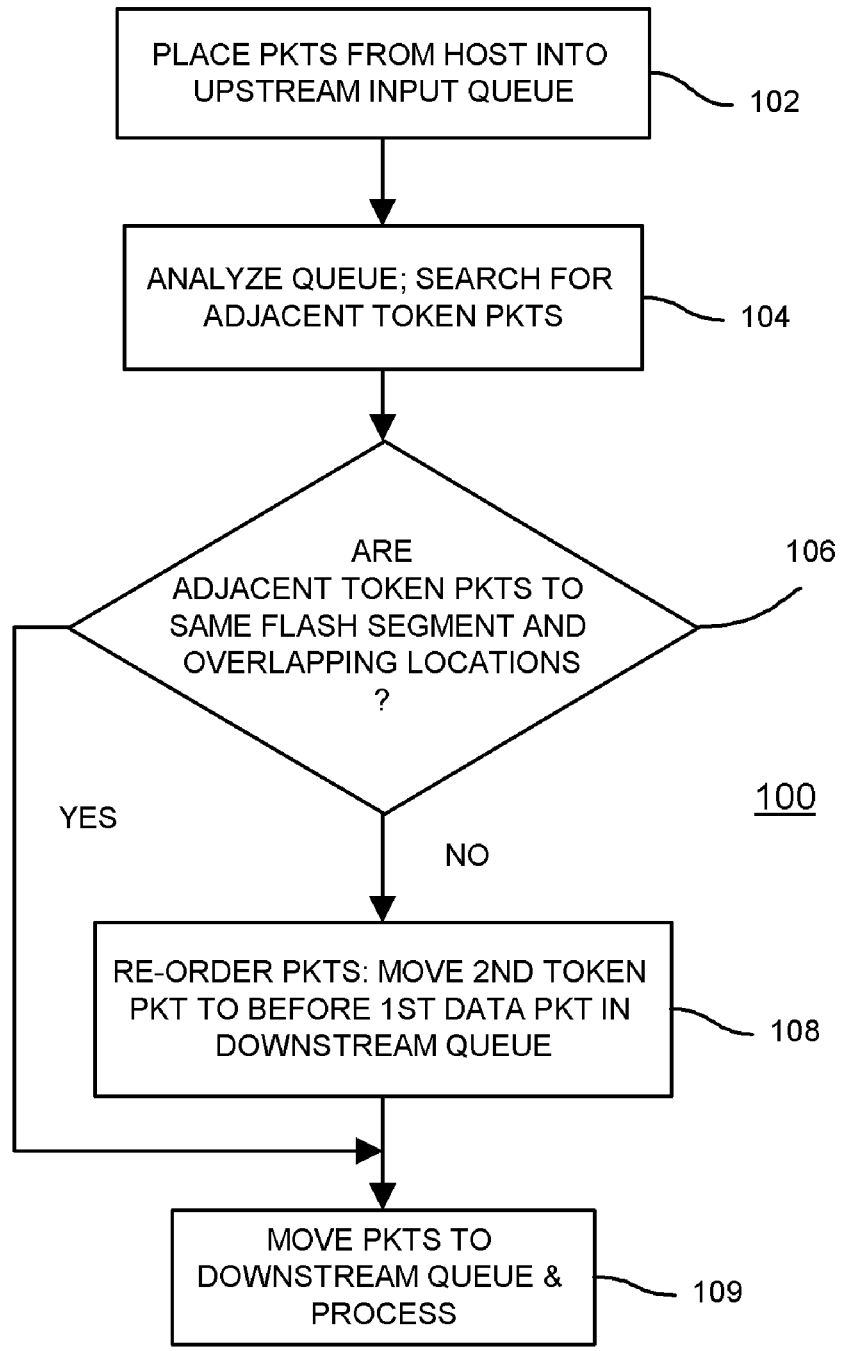
FIG. 8 is a flowchart of packet re-ordering by the transaction manager.

FIG. 8 is a flowchart of packet re-ordering by the transaction manager. Transaction manager 36 executes re-order process 100. Transaction manager 36 can initially stay in a loop (FIG. 10) waiting for an interrupt caused by requests from the host. When a host interrupt occurs, such as when USB upstream interface 34 detects a new packet from the host on USB bus 18, the packet is loaded into the upstream queue, step 102. Once two or more packets are in the upstream queue, transaction manager examines the packets in the upstream queue, step 104, to find token packets. When the two token packets in a sequence are to the same flash segment and have overlapping memory locations, step 106, then the packets for these adjacent transactions are moved to the downstream queue, step 109, without re-ordering.

When token packets for adjacent transactions are to different memory segments, or to different, non-overlapping memory locations, step 106, then packets are re-ordered. The second token packet is moved up into the first transaction, step 108. The second token packet can be placed immediately after the first token packet, as shown in FIGS. 5, 6 The re-ordered packets are then copied to the downstream queue and processed.

A virtual storage processor operating in conjunction with re-order process 100 can translates all flash storage command, status, address and data requests in the packets from the host. An internal database can be searched for physical endpoint attributes of the USB flash storage blocks. The logical attributes from the host are then translated to physical endpoint attributes associated with the downstream flash storage endpoints. The transaction manager can use this information to determine when memory overlap occurs in step 106.

Figure 9:
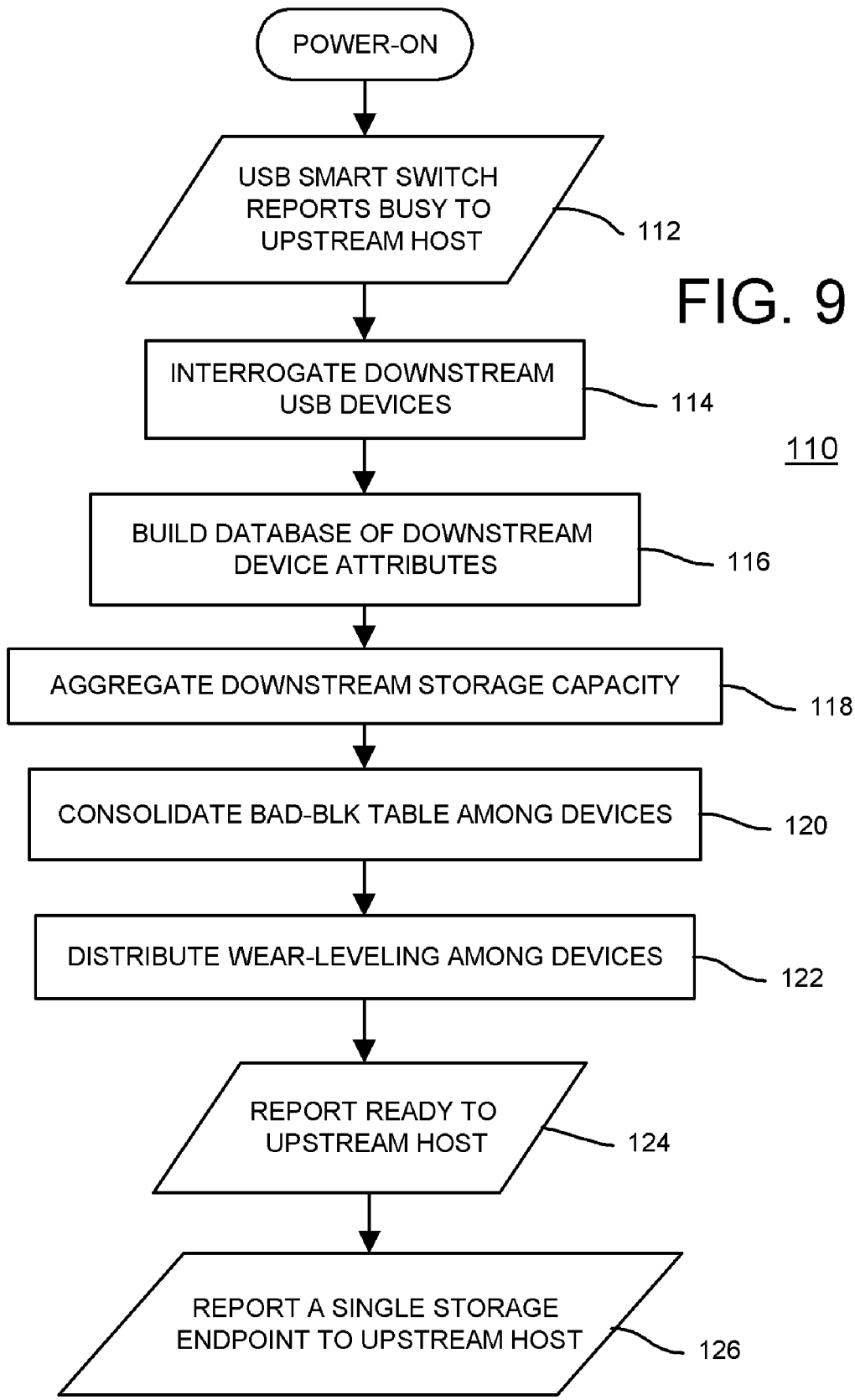
FIG. 9 is a flowchart of power-on initialization by the USB switch.

FIG. 9 is a flowchart of power-on initialization by the USB switch. Initialization process 110 is activated by a reset or by power on of the USB switch. A busy status is reported back to the host by the USB switch, step 112 while process 110 is executing. Downstream devices such as USB flash storage blocks are interrogated by the USB switch to determine their attributes such as storage capacity and USB device addresses, step 114. A database of these downstream attributes is built, step 116.

The storage capacity of all downstream USB flash storage blocks is aggregated, step 118, by summing the sizes of good blocks for all chips recorded in the memory-mapping tables. Since flash memory can wear out after repeated writing and erasing, some bad blocks may exist. Tables for the bad blocks are generated, step 120 and consolidated for all USB flash storage blocks. Wear-leveling routines or tables for these routines are distributed among the USB flash storage blocks to even wear across the USB flash storage blocks, step 122.

A ready is generated to the upstream host, step 124, once the memory tables are constructed. The configuration reported to the host is for a single pool of memory, rather than the separate USB flash storage blocks queried by the USB switch, step 126. The attributes reported back to the host are composite attributes, such as a size that is the sum of all good blocks of memory, but a speed that is the speed of the slowest downstream memory. Thus memory from several physical USB flash storage blocks can be aggregated and reported to the host as a single memory with the combined capacity of all good blocks in all USB flash storage blocks.

Figure 10:
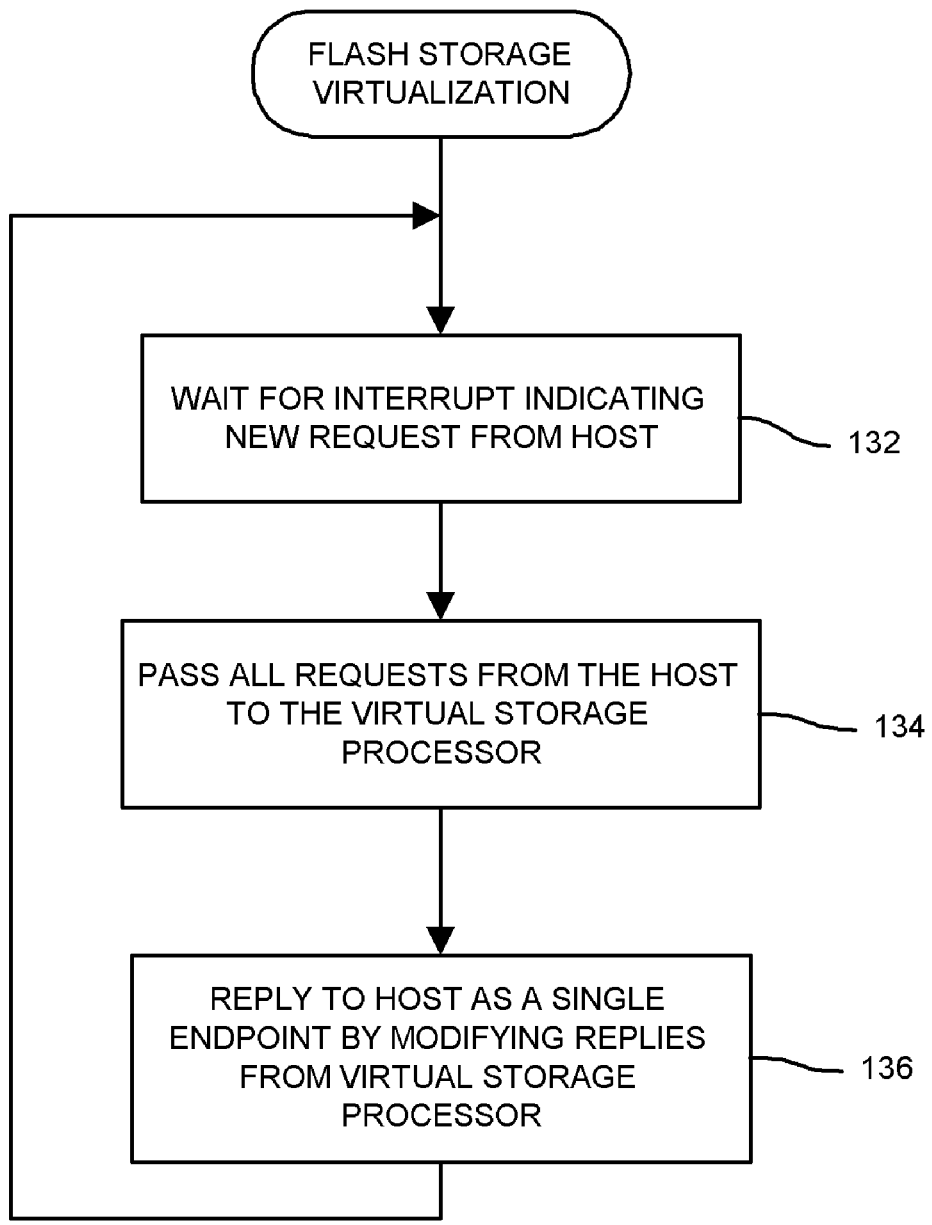
FIG. 10 is a flowchart of high-level operation of the transaction manager.

FIG. 10 is a flowchart of high-level operation of the transaction manager. In operating loop 130, transaction manager 36 can initially stay in a loop waiting for an interrupt caused by requests from the host, step 132. When a host interrupt occurs, such as when USB upstream interface 34 detects a new packet from the host on USB bus 18, the request is passed to the virtual storage processor, step 134. The virtual storage processor translates all flash storage command, status, address and data requests in the packets from the host. An internal database can be searched for physical endpoint attributes of the USB flash storage blocks. The logical attributes from the host are then translated to physical endpoint attributes associated with the downstream flash storage endpoints.

When a reply is ready from the downstream flash devices, the virtual storage processor can again be consulted to modify the downstream replies. The attributes of the single endpoint memory are used to report back to the host. A single USB device address is used for all replies so that the host only recognizes one USB device at the USB switch. Thus the host sees a single memory rather than the multiple USB flash storage blocks downstream of the USB switch. One virtual endpoint is shown to the host by the USB switch.

Figure 11:
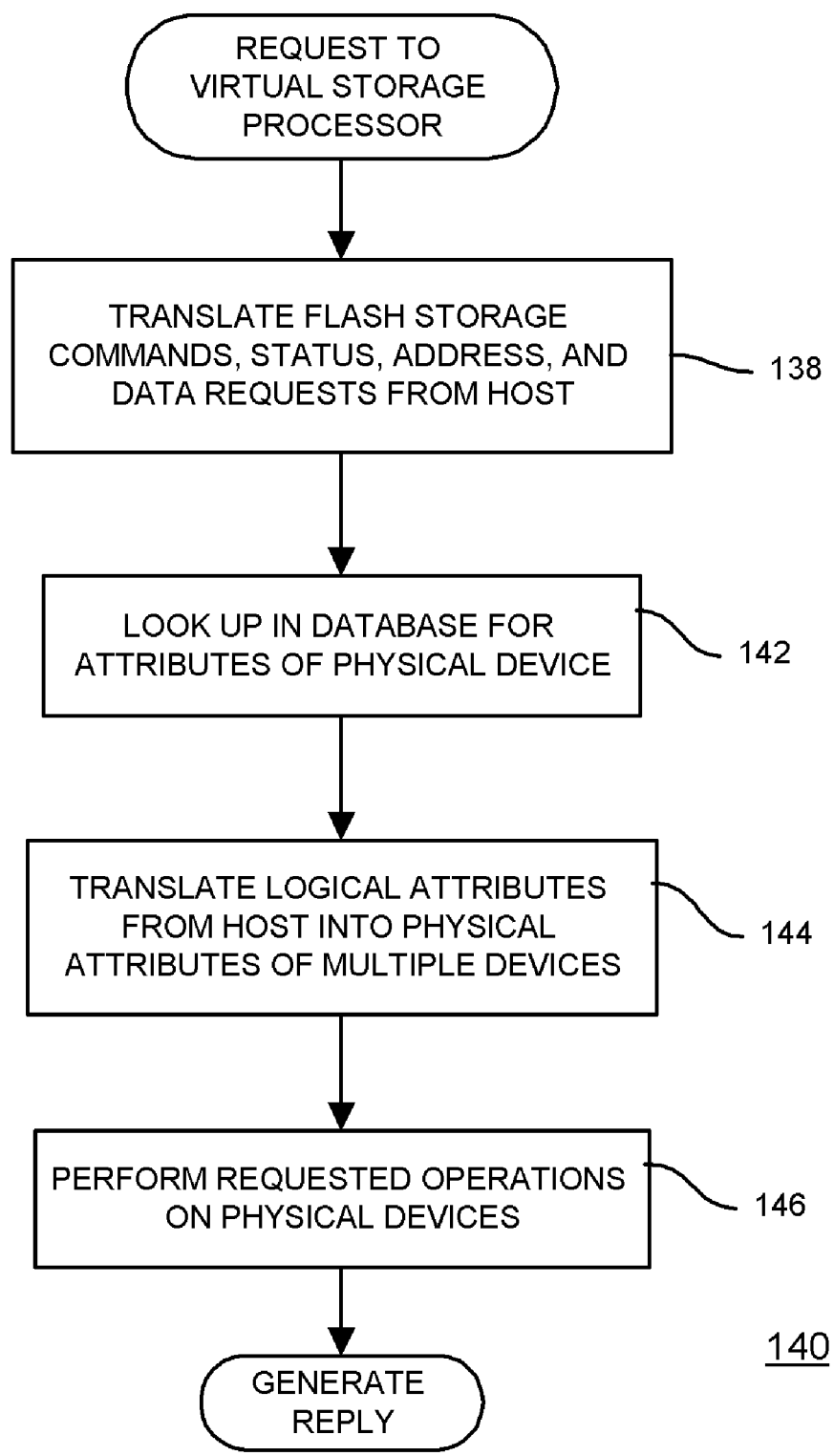
FIG. 11 is a flowchart of operation of the virtual storage processor.

FIG. 11 is a flowchart of operation of the virtual storage processor. When the transaction manager sends a request to virtual storage processor 140, any commands for the flash memory, addresses, status information, or data requests are translated from the request, step 138. The logical address from the request is looked up in a database to find the corresponding or assigned physical address in the USB flash storage blocks, step 142. Using attributes such as storage-block sizes stored with the matching entry or record in the database, logical attributes from the host are translated into physical attributes of the physical USB flash storage blocks, step 144. The one logical request may be spread across several physical USB flash storage blocks, so attributes for each of the USB flash storage blocks are read, perhaps using several lookups. For example, some of the physical USB flash storage blocks may be faster than others.

Once the physical attributes are known, the flash operations can be performed, step 146. Multiple USB flash storage blocks may be accessed to fulfill the logical request from the host. Accesses to the multiple USB flash storage blocks may be overlapped or interleaved to occur at the same time to improve performance. This interleaving or overlapping is hidden from the host.

Once the physical USB flash storage blocks have been accessed, a reply to the host is generated, step 146. When packets are re-ordered, this reply may be generated before the physical operation is complete, such as for a flash write.

Data can be stored in the USB flash storage blocks in several arrangements. For example, data can be stored conventionally in a linear fashion across the USB flash storage blocks. Alternatively, data can be mirrored to provide redundant storage, such as for a redundant array of independent disks (RAID) system. For data mirroring, the physical flash storage is partitioned into two equal-size logical segments. Data is written to both segments and can be read back from either segment.

Figure 12:
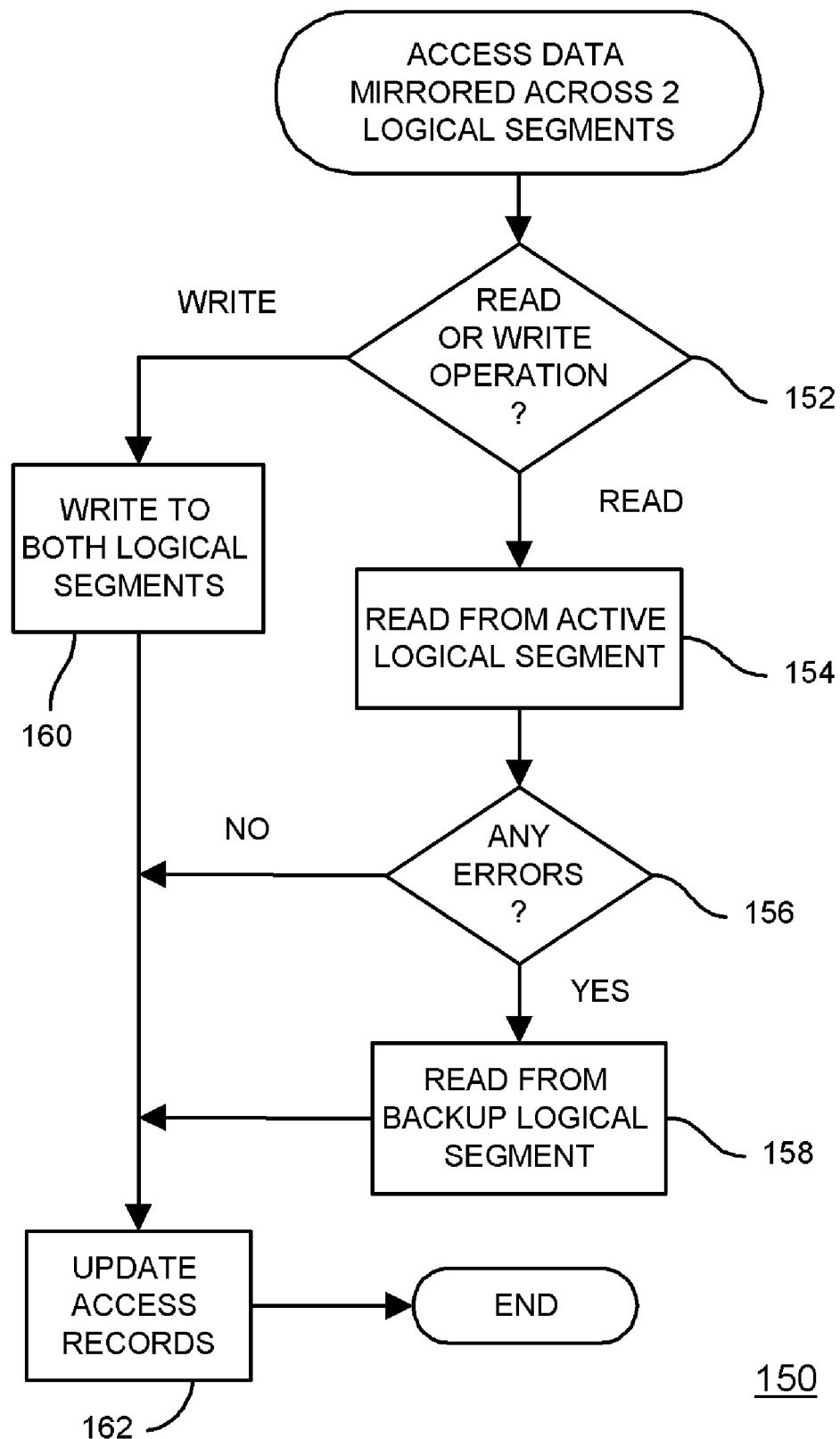
FIG. 12 shows a data access routine in a mirrored flash system.

FIG. 12 shows a data access routine in a mirrored flash system. Mirrored flash-access routine 150 is called by the transaction manager to read or write data on the physical USB flash storage blocks when data mirroring has been enabled. The type of operation, read or write, is detected from the request, step 152. For writes (or erase) operations, the data is written to both logical segments, step 160. Thus the new data is stored in both logical segments, providing redundant storage locations. Access records can be updated, step 162, before control is passed back to the transaction manager.

For read operations, the requested data is read from the active logical segment, step 154. One of the two mirrored logical segments is designated as the currently active segment from which reads are performed. The currently active segment could remain the same logical segment for a long time, or the active segment could change periodically or when an error occurs.

When the read was performed without errors, step 156, then the access records can be updated, step, 162, and control is passed back to the transaction manager. Reading errors might be detected by parity checks or by a physical flash memory device not responding. Errors may be caused by an earlier over-write, over-erasure or by a defect in a page or block When an error occurred during reading, step 156, the other or backup logical segment is read from, step 158.

Access records can be updated, step, 162, and control is passed back to the transaction manager. The backup storage segment allows for instant data recovery in case of failure.

Figure 13:
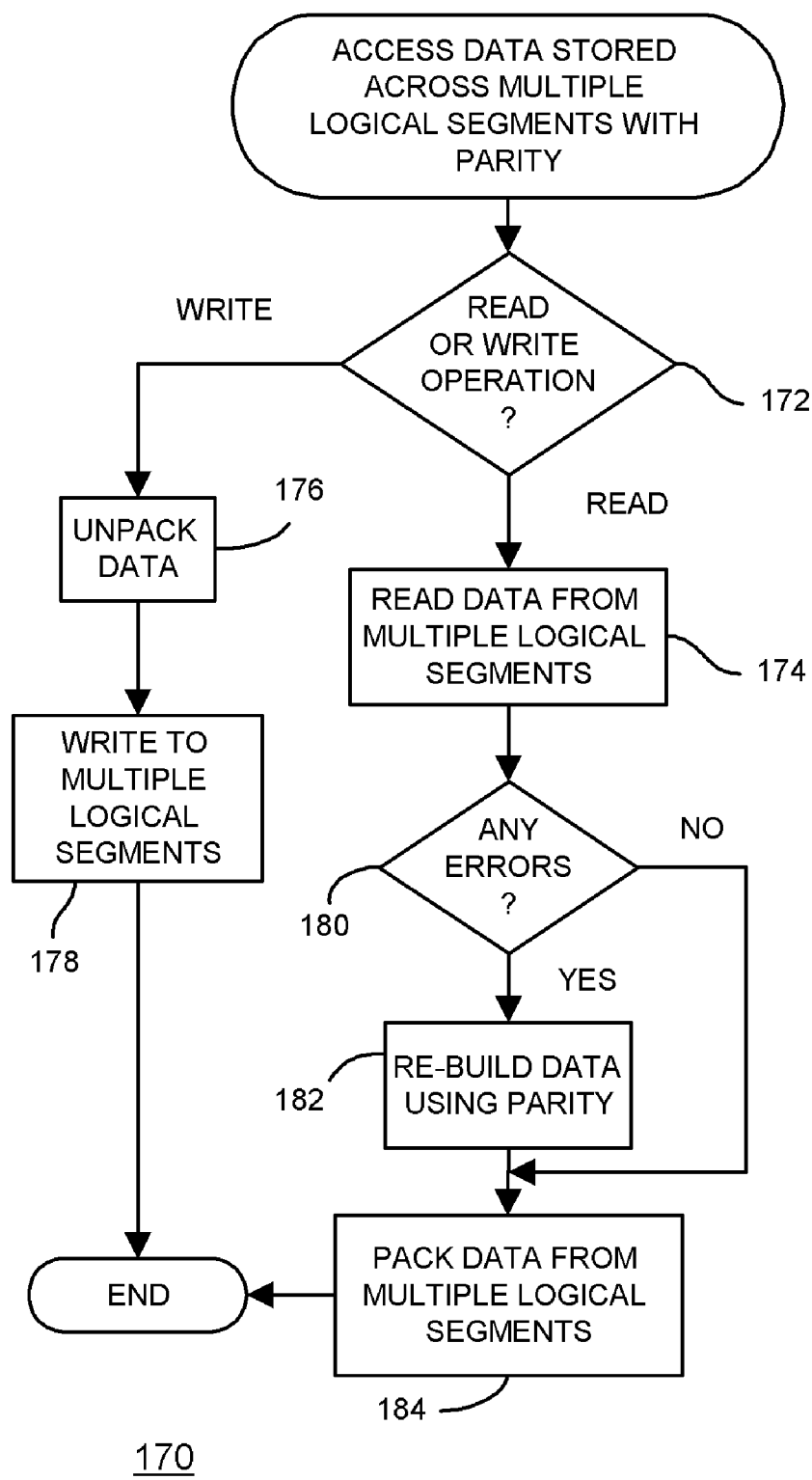
FIG. 13 is a flowchart of flash-memory access using data striping.

FIG. 13 is a flowchart of flash-memory access using data striping. The USB flash storage blocks are partitioned into multiple segments of equal size. Each data item can be stored (as a stripe) across the multiple segments. Ideally, the segments are chosen to be on as many different physical USB flash storage blocks as possible so that a physical device failure affects only a small portion of any data item.

One of the multiple segments is designates as a parity segment, and stores parity or other error-correcting code for the other segments. When a failure occurs in one of the segments, the parity information can be used to reconstruct the data item. For example, an 8-bit data item could be stored as a stripe across 8 separate flash-memory chips, with one bit stored per chip. A ninth flash-memory chip stores the parity bits. If one of the 8 flash-memory chips fails, the parity bit can be used to determine the missing bit from the failed flash-memory chip.

When the transaction manager access data in a striped storage system, striped access routine 170 is called. The type of access, read or write/erase, is determined from the request, step 172. For write/erase, the data from the host is unpacked or split into portions that are written to separate segments, step 176. The unpacked portions of the write data are then written to the multiple segments, step 178. For example, a data byte could be unpacked into 8 one-bit portions that are written to 8 different flash memory chips. The parity data is also generated during unpacking and written to the parity segment.

For a read operation, the data is read from the multiple segments, step 174. If any errors are detected, step 180, then the missing data is reconstructed using the remaining data and the parity information from the parity segment, step 182. The read data is then re-packed into a single data item from the multiple portions of data read from the multiple segments, step 184. The parity information is removed before sending the data item back to the transaction manager and on to the host.

Figure 14A:
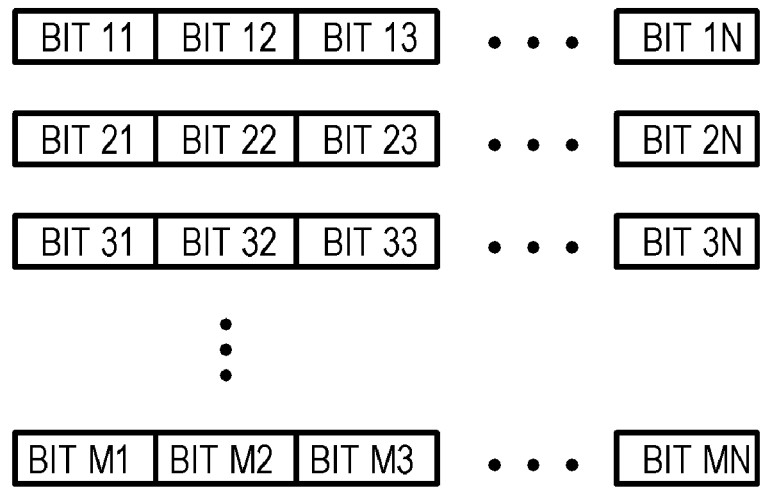
FIGS. 14A–C show various arrangements of data stored in the USB flash storage blocks.
Figure 14B:
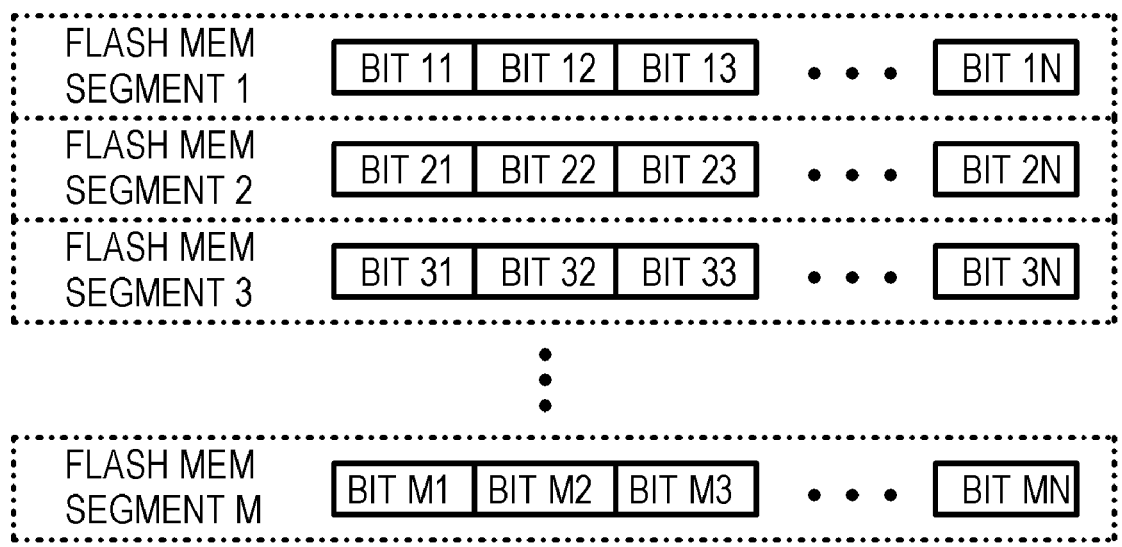
Figure 14C:
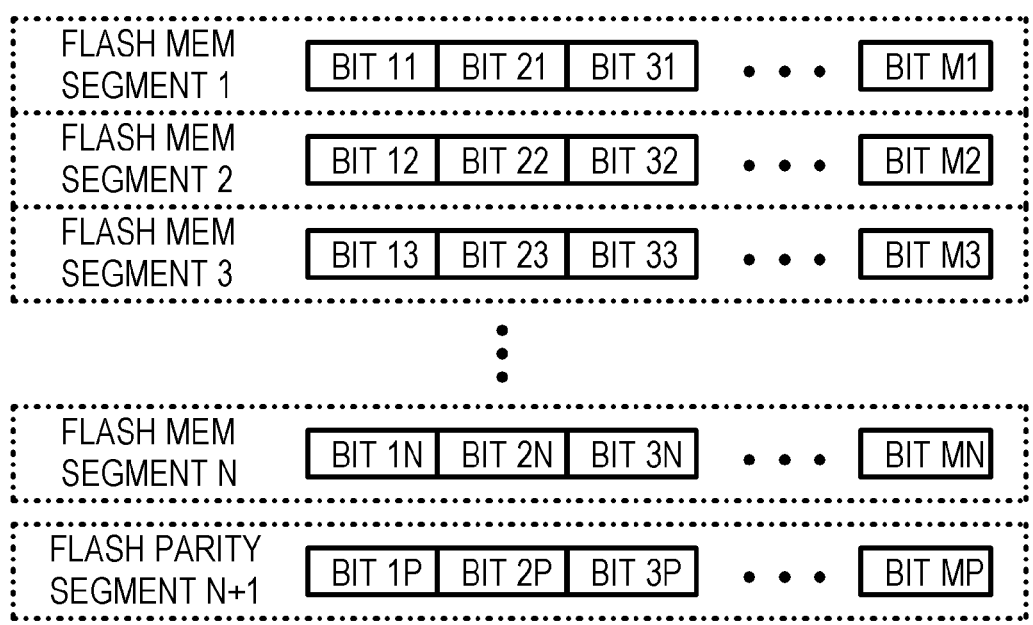

FIGS. 14A–C show various arrangements of data stored in the USB flash storage blocks. In FIG. 14A, data is arranged in a conventional linear arrangement. Each N-bit data item, such as an 8-bit byte or a 32-bit word, is stored in a memory location that is physically on one USB flash storage device. A total of M data items are stored, with some of the data items being stored on different USB flash storage devices. When a failure occurs, such as a flash-memory chip failing to return data, the entire data item is usually lost. However, other data items stored on other physical flash-memory chips can be read without errors.

In FIG. 14B, data is striped across M flash-storage segments. Each data item is stored in one of the M flash-storage segments. For example, an N-bit data item consists of bits 11, 12, 13, . . . 1N. The data item has all bits 11–1N stored in segment 1. Another data item consists of bits 21,22, 23, . . . 2N. The data item has all bits 21–2N stored in segment 2. Data items can fill up one segment before starting to fill the next segment, or data items could be interleaved across the segments.

In FIG. 14C, data striping is performed across multiple storage segments with parity. The USB flash storage blocks are partitioned into N+1 segments. The N segments are equal size, and the parity segment is sufficiently large in size to hold parity or error-correcting code (ECC) for the other N segments.

Each data item is divided into N portions with each portion stored on a different one of the N segments. The parity bit or ECC for the data item is stored in the parity segment. For example, an N-bit data item consists of bits 11, 12, 13, . . . 1N. The data item has bit 11 stored in segment 1, bit 12 stored in segment 2, bit 13 stored in segment 3, . . . and bit N stored in segment N. The parity bit, bits, or ECC is stored in the parity segment as bit or bits 1P.

In the diagram, each data item is stored across all segments as a vertical stripe. If one segment fails, most of the data item remains intact, allowing for recovery using the parity bit.

ALTERNATE EMBODIMENTS

Several other embodiments are contemplated by the inventors. For example different numbers and arrangements of USB flash storage blocks can connect to the USB switch. Rather than use USB buses, other serial buses such as PCI Express, ExpressCard, Firewire (IEEE 1394), serial ATA, serial attached small-computer system interface (SCSI), etc. The mode logic could sense the state of a pin only at power-on rather than sense the state of a dedicated pin. A certain combination or sequence of states of pins could be used to initiate a mode change, or an internal register such as a configuration register could set the mode. For example, when PCI Express is used, additional pins for the PCI Express interface can be added or substituted for the USB differential data pins. PCI express pins include a transmit differential pair PET+, PET−, and a receive differential pair PER+, PER− of data pins. A multi-bus-protocol chip could have an additional personality pin to select which serial-bus interface to use, or could have programmable registers. ExpressCard has both the USB and the PCI Express bus, so either or both buses could be present on an ExpressCard device.

The transaction manager and its controllers and functions can be implemented in a variety of ways. Functions can be programmed and executed by a CPU or other processor, or can be implemented in dedicated hardware, firmware, or in some combination. Many partitionings of the functions can be substituted.

Wider or narrower data buses and flash-memory chips could be substituted, such as with 16 or 32-bit data channels. Alternate bus architectures with nested or segmented buses could be used internal or external to the controller. Two or more internal buses can be used in the USB switch to increase throughput. More complex switch fabrics can be substituted for the internal bus.

Data striping can be done in a variety of ways, as can parity and error-correction code (ECC). Packet re-ordering can be adjusted depending on the data arrangement used to prevent re-ordering for overlapping memory locations. The USB switch can be integrated with other components or can be a stand-alone chip.

Errors may be detected through two-dimensional error checking and correction. Each storage segment, including the parity segment, has a page-based ECC. When a segment page is read, bad bits can be detected and corrected according to the strength of the ECC code, such as a Reed-Solomon code. In addition, the flash storage segments form a stripe with parity on one of the segments. Assuming there are four storage segments F(1), F(2), F(3), F(4) and one parity segment F(P). These five segments form even parity stored on F(P). Each segment has its own independent ECC to do the first level of error detection and correction. If the first level ECC fails on segment F(2), the corresponding striping bit information on F(1), F(3), F(4) and F(P) are sufficient to recover what bit information should be on F(2). The two levels of ECC form a two-dimension error checking and correction.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. Sect. 1.72(b). Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A dual-mode Universal-Serial-Bus (USB) switch comprising:
   a USB upstream interface to a host USB bus for connecting to a host;
   a plurality of USB downstream interfaces that connect to USB bus segments for connecting to a plurality of memory blocks;
   a virtual USB bridge for connecting the USB upstream interface to the plurality of USB downstream interfaces; and
   a transaction manager, coupled to control the virtual USB bridge to act as a USB hub by passing USB packets from the host to the plurality of memory blocks through the virtual USB bridge when operating in a hub mode, but for acting as a single USB endpoint to the host when operating in a single-endpoint mode;
   wherein the transaction manager passes data between the host and the memory blocks but intercepts and modifies packets from the host to generates secondary USB packets over the USB bus segments to the memory blocks when operating in the single-endpoint mode;
   wherein the transaction manager re-orders secondary packets to the memory blocks on the USB bus segments relative to a packet order of corresponding packets on the host USB bus to initiate overlapping accesses of two of the memory blocks;
   wherein the memory blocks and the USB bus segments are hidden from the host by the transaction manager when operating in the single-endpoint mode, but visible as USB endpoints to the host when operating in hub mode,
   whereby the dual-mode USB switch operates in modes having multiple endpoints or a single endpoint for multiple downstream memory blocks.

2. The dual-mode USB switch of claim 1 further comprising:
   mode logic, coupled to the transaction manager, for determining when to set the transaction manager in the hub mode and when to set the transaction manager in the single-endpoint mode.

3. The dual-mode USB switch of claim 2 wherein the mode logic is coupled to sense a voltage of a mode pin that is driven externally to a predetermined voltage to cause the transaction manager to operate in the single-endpoint mode.

4. The dual-mode USB switch of claim 1 further comprising:
   a virtual storage processor, coupled to the transaction manager, for translating a logical address from the host to a physical address for accessing requested data from the memory blocks.

5. The dual-mode USB switch of claim 4 wherein the virtual storage processor further translates the physical address to a plurality of addresses of multiple memory blocks that contain the requested data when data is stored in stripes across multiple memory segments.

6. The dual-mode USB switch of claim 4 wherein the transaction manager determines a plurality of memory capacities of the memory blocks presently connected to the plurality of USB downstream interfaces by the USB bus segments;
   wherein the transaction manager reports a sum of the plurality of memory capacities to the host as a memory capacity of a single virtual USB memory device when operating in the single-endpoint mode,
   whereby memory capacities are aggregated.

7. The dual-mode USB switch of claim 6 wherein the virtual storage processor stores attributes of the memory blocks but the transaction manager reports a composite attribute to the host when queried by the host for device attributes.

8. The dual-mode USB switch of claim 7 wherein the memory blocks appear as a single USB memory device to the host because the transaction manager acts as a single USB endpoint having a single-endpoint USB device address on the host USB bus;
   wherein the transaction manager replaces USB device addresses of the memory blocks with the single-endpoint USB device address when converting secondary packets from the USB bus segments to packets to the host.

9. The dual-mode USB switch of claim 1 wherein a second token packet with a command to access data in a second of the memory blocks is re-ordered to be sent over the USB bus segments before a first handshake packet that completes a first transaction.

10. The dual-mode USB switch of claim 1 wherein a first transaction on the host USB bus comprises a first token packet with a command to access memory, a first data packet containing data accessed, and a first handshake packet ending the first transaction;
    wherein a second transaction on the host USB bus comprises a second token packet with a command to access memory, a second data packet containing data accessed, and a second handshake packet ending the second transaction;

wherein the packet order on the host USB bus is the first token packet the first data packet, the first handshake packet, the second token packet the second data packet, and the second handshake packet respectively;

wherein the transaction manager re-orders the second token packet to before the first data packet so tat a packet order on the USB bus segments to the memory blocks is a sequence of secondary packets that correspond to the first token packet the second token packet, the first data packet, the first handshake packet the second data packet and the second handshake packet respectively, whereby the second token packet is re-ordered on the USB bus segments to overlap the second transaction with the first transaction.

11. The dual-mode USB switch of claim 10 wherein packets are re-ordered when data requested by the first and second transactions are to different and non-overlapping memory locations, but packets are not re-ordered when data requested by the first and second transactions are overlapping memory locations.

12. The dual-mode USB switch of claim 1 wherein the virtual USB bridge comprises:
an internal bus for transferring USB packets;
an upstream virtual USB bridge for connecting the USB upstream interface to the internal bus;
a plurality of downstream virtual USB bridges for connecting the plurality of USB downstream interfaces to the internal bus.

13. The dual-mode USB switch of claim 12 wherein the memory blocks comprise a plurality of USB flash storage blocks containing flash memory.

14. A packet re-ordering USB switch comprising:
an upstream interface to a host USB bus that connects to a host;
a transaction manager, coupled to the upstream interface, for sending and receiving USB packets to and from the host, the USB packets arranged in transactions having a token packet to initiate a transaction, a data packet when data is transferred, and a handshake packet to end the transaction;
a first downstream interface to a first downstream bus to a first flash storage block;
a second downstream interface to a second downstream bus to a second flash storage block;
a third downstream interface to a third downstream bus to a third flash storage block; and
an internal bus between the transaction manager, the first downstream interface, the second downstream interface, and the third downstream interface;
wherein the transaction manager re-orders a second token packet from a second transaction to be sent to the first, second, or third flash storage block before the handshake packet of a first transaction that immediately precedes the second transaction when overlapping transactions,
whereby the second token packet is re-ordered to overlap transactions to the first second, and third flash storage blocks.

15. The packet re-ordering USB switch of claim 14 further comprising:
a virtual storage processor, coupled to the transaction manager, for reading and storing attributes of the first, second, and third flash storage block, and for generating addresses to the first, second, and third flash storage block in response to data requests from the host;
wherein the transaction manager reports as a single USB endpoint to the host but transfers data between the host and the first, second, and third flash storage block,
whereby a single USB endpoint is reported to the host for the first, second, and third flash storage block by the transaction manager.

16. The packet re-ordering USB switch of claim 15 wherein the virtual storage processor signals to the transaction manager to overlap a first and a second transaction when the first and second transaction each access a different one of the first second, and third flash storage blocks.

17. An aggregating serial-bus hub/switch comprising:
upstream interface means for connecting to a host bus to a host;
a plurality of downstream interface means, connected to bus segments, for serially interfacing to a plurality of memory blocks;
virtual bridge means for connecting the upstream interface means to the plurality of downstream interface means; and
transaction manager means for controlling the virtual bridge means to act as a hub by passing packets from the host to the plurality of memory blocks through the virtual bridge means when operating in a hub mode, but for acting as a single endpoint to the host when operating in a single-endpoint mode;
wherein the transaction manager means passes data between the host and the memory blocks but intercepts and modifies packets from the host to generates secondary packets over the bus segments to the memory blocks when operating in the single-endpoint mode;
wherein the transaction manager means includes means for re-ordering the secondary packets to the memory blocks on the bus segments relative to a packet order of corresponding packets on the host bus to initiate overlapping accesses of two of the memory blocks;
wherein the memory blocks and the bus segments are hidden from the host by the transaction manager means when operating in the single-endpoint mode, but visible as endpoints to the host when operating in hub mode,
whereby the dual-mode switch operates in modes having multiple endpoints or a single endpoint for multiple downstream memory blocks.

18. The aggregating serial-bus hub/switch of claim 17 further comprising:
virtual storage processor means, coupled to the transaction manager means, for translating a logical address from the host to a physical address for accessing requested data from the memory blocks.

19. The aggregating serial-bus hub/switch of claim 18 wherein the host bus is a Universal-Serial-Bus (USB), a PCI Express bus, an ExpressCard bus, a Firewire IEEE 1394 bus, a serial ATA bus, or a serial attached small-computer system interface (SCSI) bus;
wherein the bus segments are each a USB, a PCI Express bus, a Firewire IEEE 1394 bus, a serial ATA bus, or a serial attached small-computer system interface (SCSI) bus.

* * * * *